(12) United States Patent
Feinleib et al.

(10) Patent No.: US 7,805,721 B2
(45) Date of Patent: *Sep. 28, 2010

(54) SYSTEM AND METHOD FOR AUTOMATED MIGRATION FROM WINDOWS TO LINUX

(75) Inventors: David A. Feinleib, Kirkland, WA (US); Brian K. Moran, Preston, WA (US)

(73) Assignee: Likewise Software, Inc., Bellevue, WA (US)

( * ) Notice: Subject to any disclaimer, the term of this patent is extended or adjusted under 35 U.S.C. 154(b) by 1254 days.

This patent is subject to a terminal disclaimer.

(21) Appl. No.: 10/867,081

(22) Filed: Jun. 14, 2004

(65) Prior Publication Data

US 2005/0278432 A1  Dec. 15, 2005

(51) Int. Cl.
*G06F 9/45* (2006.01)
(52) U.S. Cl. ...................................................... 717/174
(58) Field of Classification Search .................. 717/174
See application file for complete search history.

(56) References Cited

U.S. PATENT DOCUMENTS 6,182,212 B1 * 1/2001 Atkins et al. ................... 713/1
6,963,981 B1 * 11/2005 Bailey et al. .................. 726/22
7,028,079 B2 * 4/2006 Mastrianni et al. .......... 709/217
7,284,043 B2 * 10/2007 Feinleib et al. ............. 709/220
2002/0178233 A1 * 11/2002 Mastrianni et al. .......... 709/217
2004/0199609 A1 * 10/2004 Papatla et al. ............... 709/220
2006/0026195 A1 * 2/2006 Gu et al. ...................... 707/102
2006/0064474 A1 * 3/2006 Feinleib et al. ............. 709/220

\* cited by examiner

*Primary Examiner*—John Chavis

(57) ABSTRACT

A system and method for automating the migration of configuration settings and data from computer systems running the Windows® operating system to computer systems running the Linux® operating system. The method utilizes data from one or more sources to create the configuration of the target system, and translates between settings related to the Windows® systems and Linux® systems involved. As a result, it simplifies the otherwise complex and time-consuming task of migrating from one server to another, specifically when migrating between two operating systems that provide similar functionality but are configured in distinctly different ways.

15 Claims, 10 Drawing Sheets

SYSTEM AND METHOD FOR AUTOMATED MIGRATION FROM WINDOWS TO LINUX

FIELD OF THE INVENTION

The field of invention relates generally to a system and method for the automated migration of a system running a member of the Windows® family of operating systems to a system running a member of the Linux® family of operating systems.

BACKGROUND INFORMATION

It can be appreciated that a large number of server computers in operation today run a member of the Microsoft Windows® family of operating systems, such as Windows® Server 2003 Data Center Edition and Windows® NT 4.0. These operating systems provide services to client computers, such as access to data stored in shared directories, access to printers connected to the server, user authentication services, networking services, directory services, etc.

It can also be appreciated that various versions of the Linux® operating system, including Red Hat Enterprise Server AS 3 and Novell SuSE Professional Linux® 9 are becoming more popular and more widely deployed.

One skilled in the art will recognize that operating system services and applications are typically configured according to the user's needs, and that such configuration settings are stored through a persistent mechanism, such as an on-disk file, so that when the system is reset or restarted, the configuration settings can be read and the service or application can run with the stored settings; in this way the user does not have to reconfigure the settings from scratch.

Windows® and Linux® operating systems provide many similar functions, such as the ability for client computers to access data on a server and to display text and graphics on a computer screen. On Windows® operating system, for example, file and print sharing via the Server Message Block (SMB) protocol and user authentication via the NT LAN Manager protocol (NTLM) is provided by the operating system itself. Similar functionality is provided on Linux® operating system, but requires additional modules to be installed. Advanced Server for UNIX, ported to Linux® operating system, is one application that provides file, print, and authentication via the SMB and NTLM protocols. Samba is another application that provides such functionality. Syntax Totalnet Advanced Server is a third such product.

Although the functions provided are similar between the two operating systems, often they are provided or configured in different and incompatible ways. For example, configuration settings related to file shares are stored in a set of data files called the system registry on Windows® operating system, while configuration settings related to file shares are stored in text based configuration files on Linux® operating system, e.g. a format that is different from its counterpart on Windows® operating system. Similarly, data related to directory services, which, as the name suggests, deals with information about the people and resources available on a given computer system or network, is stored in the Active Directory on Windows® operating system, but is stored using OpenLDAP or other software on Linux® operating system. Likewise, configuration settings for Internet Information Server (IIS), a web server that runs on Windows® operating system are stored in the Windows® operating system registry, while configuration settings for Apache, a web server often deployed on Linux® operating system are stored in a text file named HTTPD.CONF.

While the Linux® operating system has existed for a number of years, it is only recently that it has reached a point of viability and stability that system administrators will consider deploying a server running Linux® operating system where they might today or in the past have run Windows® operating system. With the functionality provided by the two operating system families becoming more and more similar, system administrators running the Windows® operating system desire, for financial, technical, and other reasons, to migrate the services provided and data stored on servers running the Windows® operating system to Linux® operating system.

Due to the incompatibility in the ways in which the two operating system families are configured and the ways in which they store configuration settings, however, this task is a difficult, time-consuming, and error-prone manual process. In particular, an administrator must understand the particular settings in question on Windows® operating system, and the corresponding settings on Linux® operating system. Often, administrators are hampered by their lack of experience on one or the other of the two operating systems, the difficulty of finding the appropriate settings on either system, the challenge of translating between the settings of the two systems, and the need to install and configure additional software and to write and configure scripts on the Linux® system to have it provide the equivalent functions as the Windows® system.

The problem of migration is not a new one, as administrators have been confronted with the problem of moving from an old version of an operating system to a new version for years. Alternatively, administrators have been forced to move from one physical machine to another to take advantage of new hardware capabilities or because of a desire to move off an old piece of hardware. However, these migrations have been relatively simple given the relative compatibility in settings between the old and new operating system versions or between the two machines, which may even be running the same version of the operating system.

The present invention addresses the aforementioned problem by automating the migration process from Windows® operating system to Linux® operating system, as it relates both to configuration information and to data.

SUMMARY OF THE INVENTION

In accordance with aspects of the present invention, systems and methods are disclosed that address the foregoing computer system migration, translation, and configuration problems, and more specifically but not exclusively relate to a set of software tools, wizards, translation modules, discovery modules, installation and configuration modules, and processes used to automate the currently manual process of migrating from Windows® operating system to Linux® operating system.

According to one set of techniques, a source discovery wizard determines the services running on a Windows® machine. Then, if a target system already has Linux® operating system installed on it, a target discovery wizard module determines if any additional services need to be installed on the target system and/or if any services must be removed for the target system to provide the services required as indicated by the discovery wizard. A configuration module generates a list of required modifications. If the target system does not already have Linux® operating system installed on it, the configuration module creates an installation configuration file for use by the operating system installation program, ensuring that the operating system installation program will install the required software.

According to further aspects of the techniques, a configuration conversion tool translates the settings on Windows® operating system to their counterparts on Linux® operating system. Lookup tables are employed to determine the proper mapping between configuration settings on the two systems. Such settings may include, but are not limited to, the names and paths of file shares, printer resources, directory information, user and group settings, etc. The result of the translation is a list of now translated target settings, which may be stored in a variety of forms, including, but not limited to, a text or binary file, or may be communicated directly to another module or application without being stored.

According to another aspect of the techniques, the target installer configures the target system appropriately, with the result that it has the necessary software installed to provide the required services. This may include the automatic downloading of required software from the Internet or from an internal file server or Intranet site, prompting the user to insert various media such as CDs containing the necessary software, etc.

According to another aspect, the target configuration module configures the services on the target system based on the target configuration list or via direct communication from the configuration conversion tool. Configuration includes but is not limited to, the configuration of file and print services, directory services, authentication services, and network services. As part of configuring file services, directories may be created. As part of configuring print services, print drivers may be installed.

According to another aspect, a data move module moves data files from the Windows® system to the Linux® system. In one embodiment, the data is stored on an intermediate file server. One skilled in the art will recognize that such a file server could be a server on the Internet, an Intranet web server, or a file server. The data move module may be configured to filter files to be moved based on specified criteria, such as the names or extensions of files, or the size of files. In an innovative technique, the data move module may also scan for viruses or call an external program to scan for viruses as an integrated part of the copy or move operation.

According to further aspects, translated configuration information is stored on a repository server, which stores one or more configurations such that the translated configuration can be deployed to another Linux® server, for example, in case of failure.

According to other aspects of the techniques, a configuration conversion tool migrates settings from a Windows® server running the enterprise directory services repository Active Directory to a Linux® server running the enterprise directory services program OpenLDAP.

In one embodiment, the tools, wizards, and other modules are controlled by the administrator completely from a system running the Windows® operating system, e.g. the source server, or another system running Windows® operating system and accessing the same network. This means that the administrator need not interact directly with the Linux® system, unless desired, at any point during the process. In another embodiment, all tools, wizards, one or more tools, wizards, and modules run on the Linux® operating system so that an administrator can perform migration without interacting directly with a Windows® system, unless desired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for facilitating migration between operating systems, such as from a Windows® operating system to a Linux® operating system are described herein. In the following description, numerous specific details are set forth (such as the Perl scripting language) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
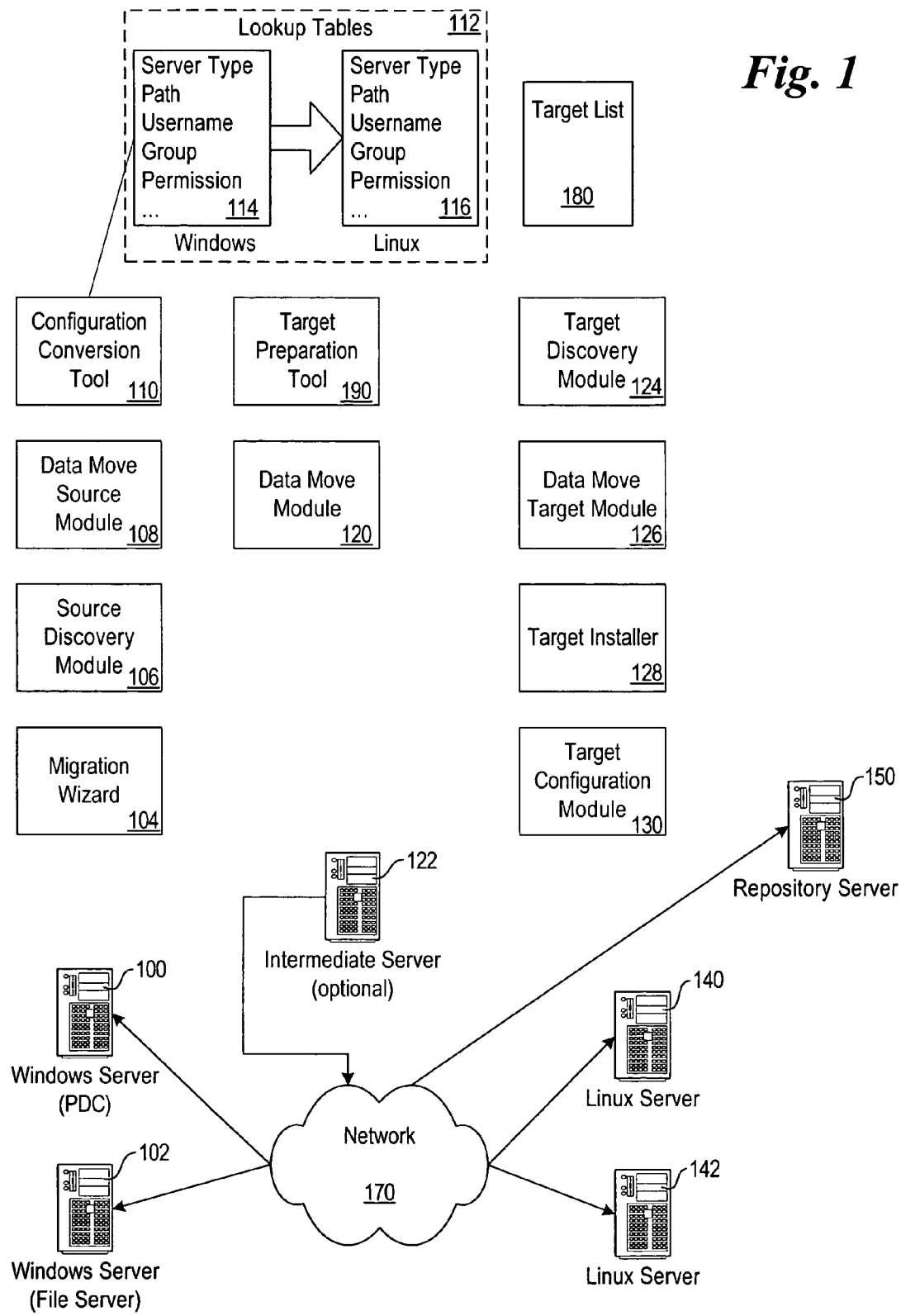
FIG. 1 is a schematic drawing of a software architecture including various modules that enables migration between a Windows® and a Linux® operating system, according to one embodiment of the invention.

FIG. 1 shows a software architecture including various modules that enables migration between a Windows® operating system and a Linux® operating system. An exemplary set of servers used for explaining the migration process, according to one embodiment, are shown in FIG. 1. These include Windows® servers 100 and 102, an optional intermediate server 122, Linux® servers 140 and 142, and a repository server 150, all of which are linked in communication via a network 170. The software modules include a migration wizard 104, a source discovery module 106, a data move source module 108, a configuration conversion tool 110, a target preparation tool 190, a data move module 120, a target discovery module 124, a data move target module 126, a target installer 128, and a target installation module 130.

Figure 3:
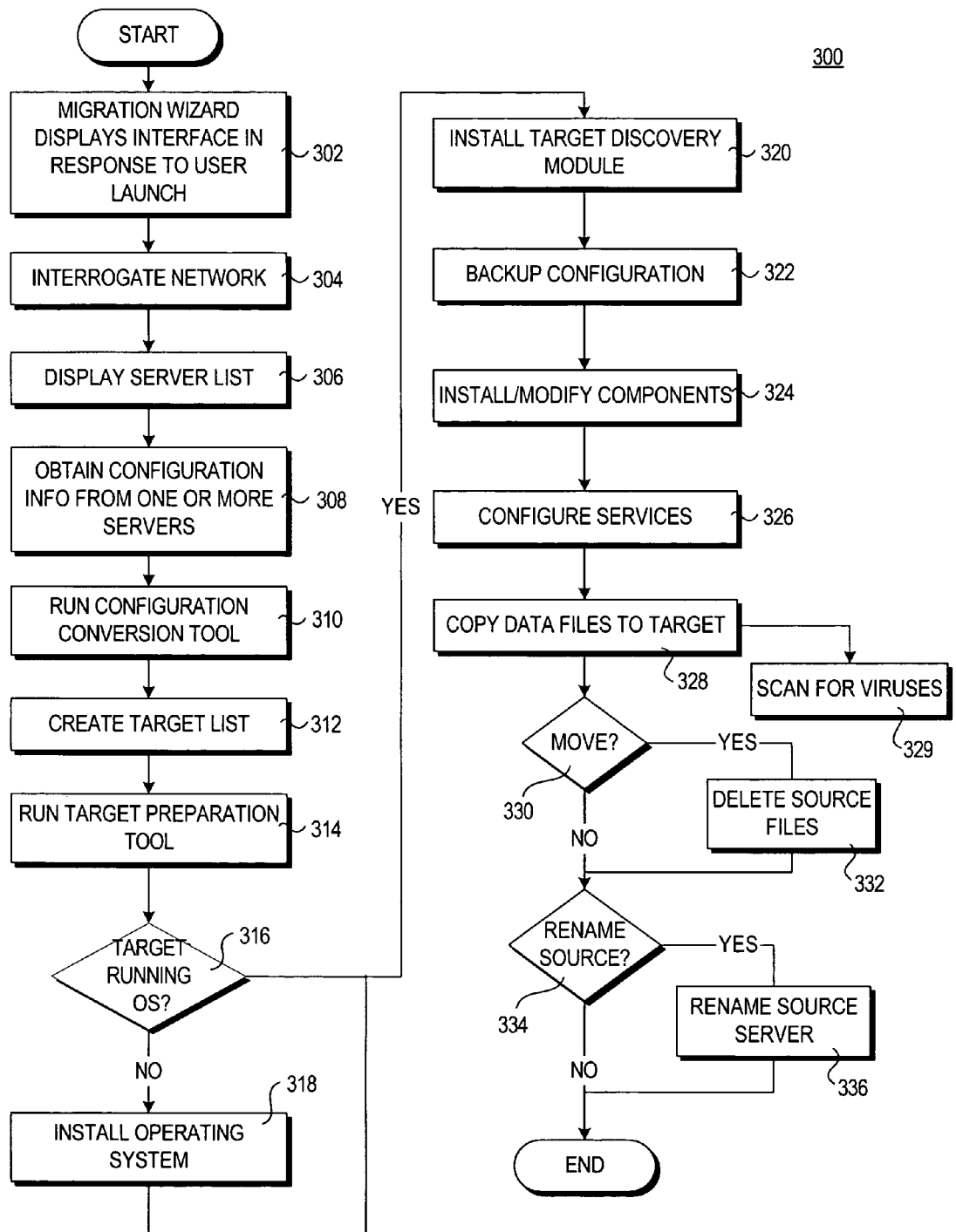
FIG. 3 is a flowchart illustrating operations and logic performed during one portion of the Windows® operating system to Linux® operating system migration process, according to one embodiment of the invention.

Migration Wizard 104 is installed and run by an administrator on Windows® Server 102. Thus commences a migration process 300 shown in FIG. 3. First, Migration Wizard 104 presents a graphical user interface to the user in a block 302, which guides the user through the migration process and controls the operation of the modules associated with the migration process. One skilled in the art will recognize that such an interface could also be presented through a variety of other means, including, but not limited to, text or voice based interfaces. In one embodiment, Migration Wizard 104 is installed on another system (not shown) running Windows® operating system that is connected to Network 170. Such connection can take place via a wired or wireless link, running any of a variety of protocols.

In a block 304, Source Discovery Module 106 interrogates Network 170 to determine the kind of servers running on the network. Source Discovery Module 106 can also be directed by the user to interrogate a particular system on the network, such as Windows® Server 102. Migration Wizard 104 prompts the user for a username and password, if required, so that it can use those credentials to access the network and one or more systems on the network.

Having discovered the systems on the network or having been directed to a particular server by the user, Migration Wizard 104 presents a list of servers available for migration in a block 306. Migration Wizard 104 displays additional information to the user related to the servers shown, including, but not limited to, the type of each server. Types of servers that are supported and displayed include, but are not limited to, servers running versions of Windows® NT 4, Windows® 2000 server, and Windows® 2003 server. Available Linux® target servers are also presented to the user or the user may specify a particular system, for example, by name or IP address. In addition, more specific information about each server may be displayed, such as whether it is a Primary Domain Controller, a Backup Domain Controller, a stand-alone server, etc.

Available Linux® target servers are also presented to the user or the user may specify a particular server as the Linux® target server, for example, by name or IP address. As used herein, a "Linux® target server" comprises a target server to which Windows® operating system configuration information, and optional data files, may be migrated. A Linux® target server may or may not already have an instance of a Linux® operating system installed on it prior to initiation of the migration process.

Based on the server the user wishes to migrate, Source Discovery Module 106 obtains configuration information from one or more Windows® servers in a block 308. Windows® Server 100 is a Primary Domain Controller (PDC), which contains the master directory services information and permissions data (usernames, passwords, and group names). Windows® Server 102 is a File Server that is a member of the Domain but does not itself contain permissions or directory services data. In one embodiment, where Windows® Server 102 is the server selected for migration, Source Discovery Module 106 must obtain information both from Windows® Server 100 and Windows® Server 102; from Windows® Server 100 it obtains directory services, permissions, and other configuration information; from Windows® Server 102 it obtains configuration information specific to Windows® Server 102, such as the directories that have been shared on Windows® Server 102. Migration Wizard 104 can support the selection of one or more servers to be migrated, such servers to be migrated one at a time, sequentially, or in parallel.

In one embodiment, the Migration Wizard 104 now runs Configuration Conversion Tool 110 in a block 310. In general, Configuration Conversion Tool 110 may be implemented as a separate program, as a series of functions in the Migration Wizard 104, as a dynamic link library, or via a variety of other means. In another embodiment, the configuration conversion tool runs remotely, on another system.

Configuration Conversion Tool 110 uses information from Source Discovery Module 106 in combination with Lookup Tables 114 and 116 to create Target List 180 in a block 312. Target List 180 specifies not only the translated settings to be configured on the Linux® target server, such as Linux® Server 140, but also the operating system, software modules, and applications required for Linux® Server 140 to provide the equivalent services as those that are provided by Windows® Server 102 or Windows® Server 100.

In a block 314, Migration Wizard 104 runs Target Preparation Tool 190 to evaluate target Linux® Server 140. In one embodiment, if target Linux® Server 140 is discovered to already be running an operating system in a decision block 316, then Migration Wizard 104 attempts to install Target Discovery Module 124 on target Linux® Server 140, as depicted in a block 320. It should be noted that Migration Wizard 104 prompts the user, as necessary, for username and password information so that Target Preparation Tool 190 can access Linux® Server 140 with the proper credentials. In another embodiment, the user installs Target Discovery Module 124 on Linux® Server 140 by installing the software from a CD-ROM or other media, or from a server accessible on the network. If Linux® Server 140 is discovered not to be running an operating system in block 316, then Target Preparation Tool 190 installs the operating system in a block 318. In general, the operating system can be installed from a variety of sources, such as a computer on the network, media such as a CD-ROM, etc.

Target Preparation Tool 190 creates various configuration files to automate the installation of the operating system as part of block 318. In one embodiment, Target Preparation Tool 190 creates an XML file containing a number of configuration parameters, and passes the name and location of that file to the operating system installation program, which the operating system installation program then uses to properly install on the target system. Once operating system installation is complete, Migration Wizard 104 installs target discovery module on Linux® Server 140 in a block 320.

In a block 322, Target Installer 128 creates a backup of the system configuration of Linux® Server 140 prior to installing or removing any components. This operation can be skipped if the user so chooses. Configuration files only, or configuration and system files, e.g. programs, applications, modules, libraries, etc. can be backed up; such backup can occur to media such as a CD-ROM or to another server such as Repository Server 150.

Target Discovery Module 124 compares the list of software and modules indicated by Target List 180 with the operating system, software modules, and applications installed on target Linux® Server 140. Based on this comparison, Target Installer 128 installs necessary components on Linux® Server 140, and removes any conflicting components, as depicted in a block 324.

In a block 326, Target Configuration Module 130 configures the operating system services and applications on Linux® Server 140 to provide the services indicated by Target List 180. In one embodiment, Target Configuration Module 130 configures the Samba file and print serving application to provide file sharing, print, and authentication services. In another embodiment, Target Configuration Module 130 configures the Advanced Server for UNIX application to provide file sharing, print, and authentication services. In one embodiment, Target Configuration Module 130 configures Samba or Advanced Server for UNIX to act as a Primary Domain Controller, as a domain member server, or as a stand-alone server. In another embodiment, Target Configuration Module 130 creates particular file shares, and configures Samba or Advanced Server for UNIX to make the shares accessible to client computers. In yet another embodiment, Target Configuration Module 130 configures Samba or Advanced Server for UNIX with groups, users, and permission information. One skilled in the art will recognize that Advanced Server for UNIX could be replaced with another application or piece of software capable of providing file, print, and authentication services. Target Configuration Model 130 can configure target Linux® Server 140 based on Target List 180 or based on direct communication from Configuration Conversion Tool 110, over a network.

Once configuration is completed, according to the user's instructions, Data Move Module 120 moves or copies files stored on the source server (e.g., Windows® server 100 or Windows® server 102) to target Linux® Server 140, as provided in a block 328. As shown by a decision block 330, in the case of a move, files are deleted from the source server in a block 332. Optionally, files are backed up prior to or during the copy or move to Intermediate Server 122 or to Repository Server 150, or backed up to media inserted into the source system such as a writeable CD-ROM, a secondary disk drive, tape, or other media. In this way, target Linux® Server 140 now stores the data originally accessible on the source server (e.g., Windows® server 100 or Windows® server 102).

In a block 329, Data Move Module 120 may scan for viruses and delete or quarantine infected files prior to, during, or after the move as an integrated part of migration process 300. It will be recognized that such scanning can occur as a function call within Data Move Module 120, as a call or an external program such as a commercial anti-virus scanning product, or via other means. In a related technique, Target Preparation Tool 190 can scan for viruses and delete or quarantine files on target Linux® Server 140 as an integrated part of migration process 300.

After the operations of the migration process so far outlined above have been completed, if so directed by the user in a block 334, Migration Wizard 104 can rename the source server to a different name in a block 336 and then communicate with Target Configuration Module 130 so that it renames target Linux® Server 140 to have the name previously used for the source server. In this way, the user can access the new server 140 using the same server name as previously used for source server 100 or 102 with no change. In another embodiment, the renaming process takes place prior to any migration occurring. It will be recognized by one skilled in the art that the user direction described can occur at any point during the migration process, such as at the beginning, even though the rename takes place at the end of the process.

As part of or separate from the migration process, translated configuration information can be stored on Repository Server 150. With configuration information stored on Repository Server 150, servers with the same configuration (but with slight modifications, such as server name) can easily be created, such as Linux® Server 142. In the case where a backup server is desired or numerous similar configurations are desired, Repository Server 150 makes the duplication and deployment with slight modification of configurations easy.

Figure 2:
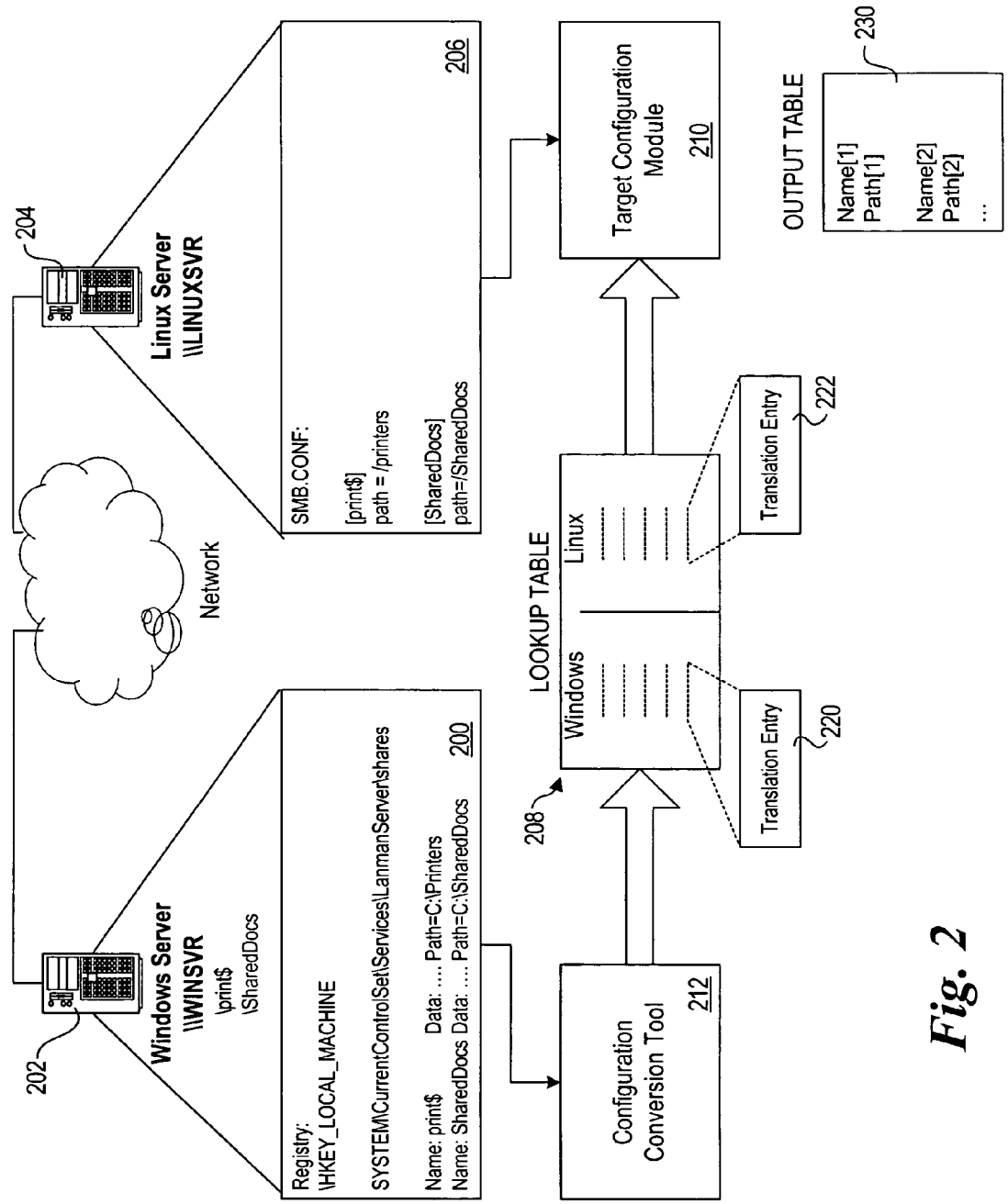
FIG. 2 is a drawing illustrating the Windows® operating system to Linux® operating system automated translation process.

FIG. 2 illustrates a detailed view of one embodiment of the automated translation process invoked by the present invention to move settings from a Windows® Server 202 to Linux® Server 204. Windows® Server 202 is a computer running any of a number of versions of the Windows® operating system, including, but not limited to, "Windows® NT" and "Windows® 2000." Linux® Server 204 is a computer running any of a number of versions of the Linux® operating system, including, but not limited to, "Red Hat Linux® Enterprise Edition 3 AS."

In FIG. 2, Registry 200 contains a set of data files commonly used by the Windows® operating system and by applications that run on Windows® operating system to store configuration data and other settings. File SMB.CONF 206 is a configuration file used by the Samba program referenced earlier to store its configuration and settings information. Registry 200 contains settings related to file shares in Name-Value pairs, i.e. Name contains the name of the file share, while Value contains information about the file share, including but not limited to the path and permissions for the share. File SMB.CONF 206 contains similar information, but in different form. The illustrated embodiment of the present invention uses lookup table 208 to translate between the settings as stored on Windows® Server 202 and Linux® Server 204.

Figure 4:
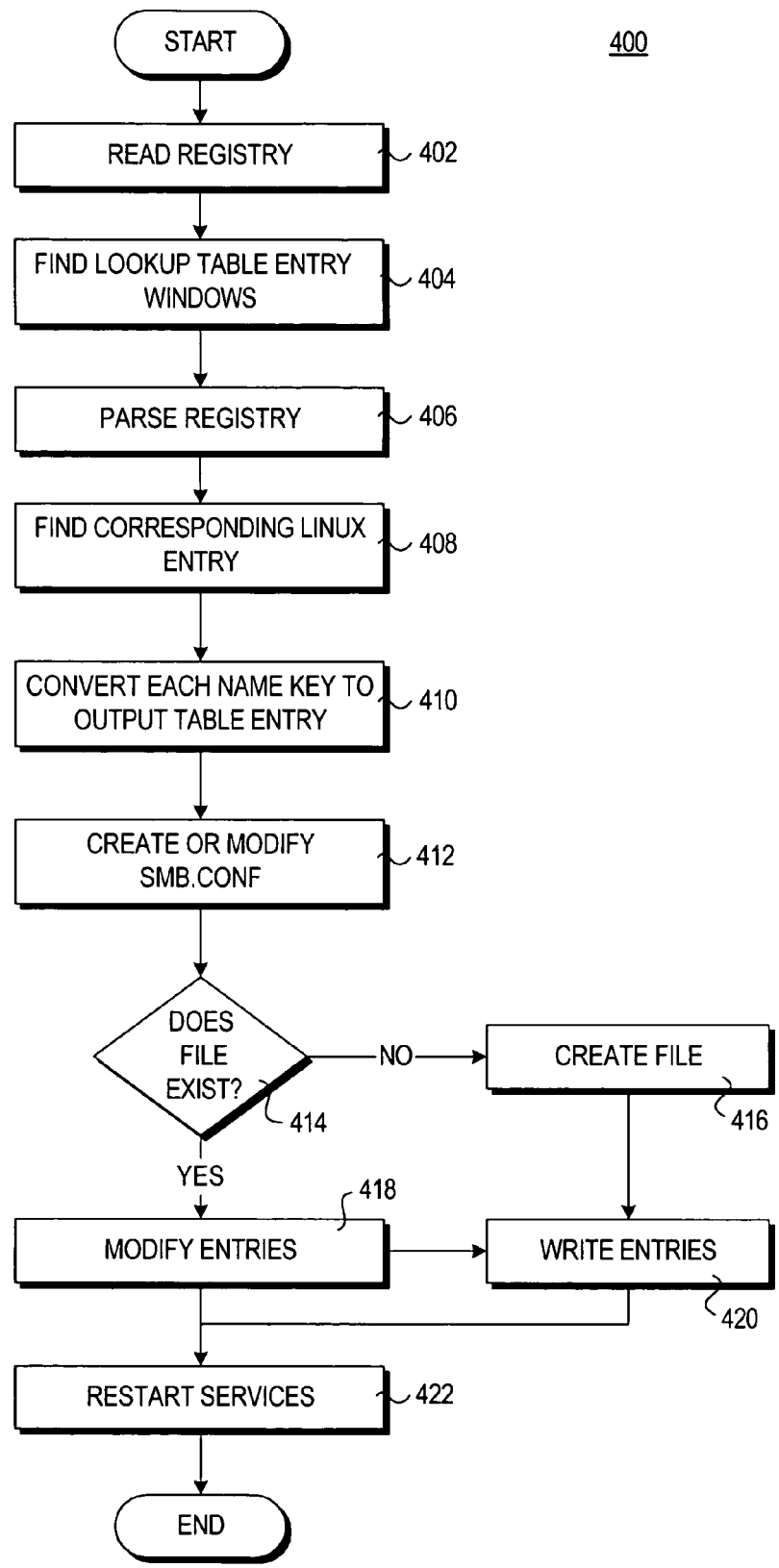
FIG. 4 is a flowchart illustrating operations and logic performed during another portion of the Windows® operating system to Linux® operating system migration process, according to one embodiment of the invention.

After initialization by the user, as shown in FIG. 4, Configuration Conversion Tool 212 reads Registry 200 during a conversion process 400 to obtain the settings related to file shares on Windows® Server 202, e.g. the two directories shared by Windows® Server 202, "\print$" and "\SharedDocs," as shown in a block 402. Reading is accomplished by reading the registry directly using file read operations, by using standard system calls, or through other means. In one embodiment, reading is performed remotely, such that Configuration Conversion Tool 212 runs on a different system than where Registry 200 resides.

Configuration Conversion Tool 212 uses Lookup Table 208 to translate between the Windows® operating system and Linux® operating system settings. For each Translation Entry 220 in the Windows® portion of the table, there is a corresponding Linux® Translation Entry 222. A particular entry may contain a simple translation such as an indicator that a Name value stored in the Windows® registry should be stored as the same value but written in brackets to the SMB.CONF file on Linux® operating system. Alternatively, a particular entry may be more complex, including script, commands to execute, programs to run, multiple text configuration files to be modified, etc. Finding lookup table entries for Windows® Name-Value pairs is performed in a block 404.

In one embodiment, Configuration Conversion Tool 212 looks for Translation Entry 220 "MoveFileShare" in block 404. Translation Entry 220 directs Configuration Conversion Tool 212 to parse the registry value, for each share name in registry block 200 in a block 406. In a block 408, Configuration Conversion Tool 212 finds the corresponding MoveFileShare Translation Entry 222 in the Linux® operating system portion of the table, which directs Configuration Conversion tool 212 to convert the parsed entries from registry block 200 into writeable form for Target Configuration Module 210 in a block 410.

In a block 412, each "Name" key in registry block 200 is converted into a corresponding entry in Output Table 230. In one embodiment, Output Table 230 is an array of structures containing the text variables Name and Path. One skilled in the art will recognize that Output Table 230 could be implemented in a variety of forms, such as a linked list, values written to a file, etc.

Next, as directed by Translation Entry 222, Target Configuration Module 210 creates a new SMB.CONF file if one does not exist, as indicated at a decision block 414 and a block 416 or opens the existing SMB.CONF file for reading and creates a modified file based on the original file and the new entries to be written. That is, if a new file is created, Target Configuration Module 210 writes entries to the file based on Output Table 230, as depicted in a block 420. If a file exists, Target Configuration Module 210 reads each line of SMB.CONF; if it finds the specified Name entry, it modifies the contents of the section in block 418; if it does not find the entry, it adds the section at the end of the file in block 420. It will be recognized that the section could be written anywhere in the file. Upon completion, it renames the old file to a backup filename, such as SMB.CONF.OLD, and copies the new file to the old file name. SMB.CONF file 206 now contains the new or modified entries from Output Table 230. Lastly, Target Configuration Module 210 causes any necessary services, such as the SMBD file sharing service for the Samba software on target Linux® Server 204 to be restarted and/or to re-read the SMB.CONF file in a block 422. The result of the process is an automatic migration and translation of settings from Windows® Server 202 to Linux® Server 204.

Figure 5:
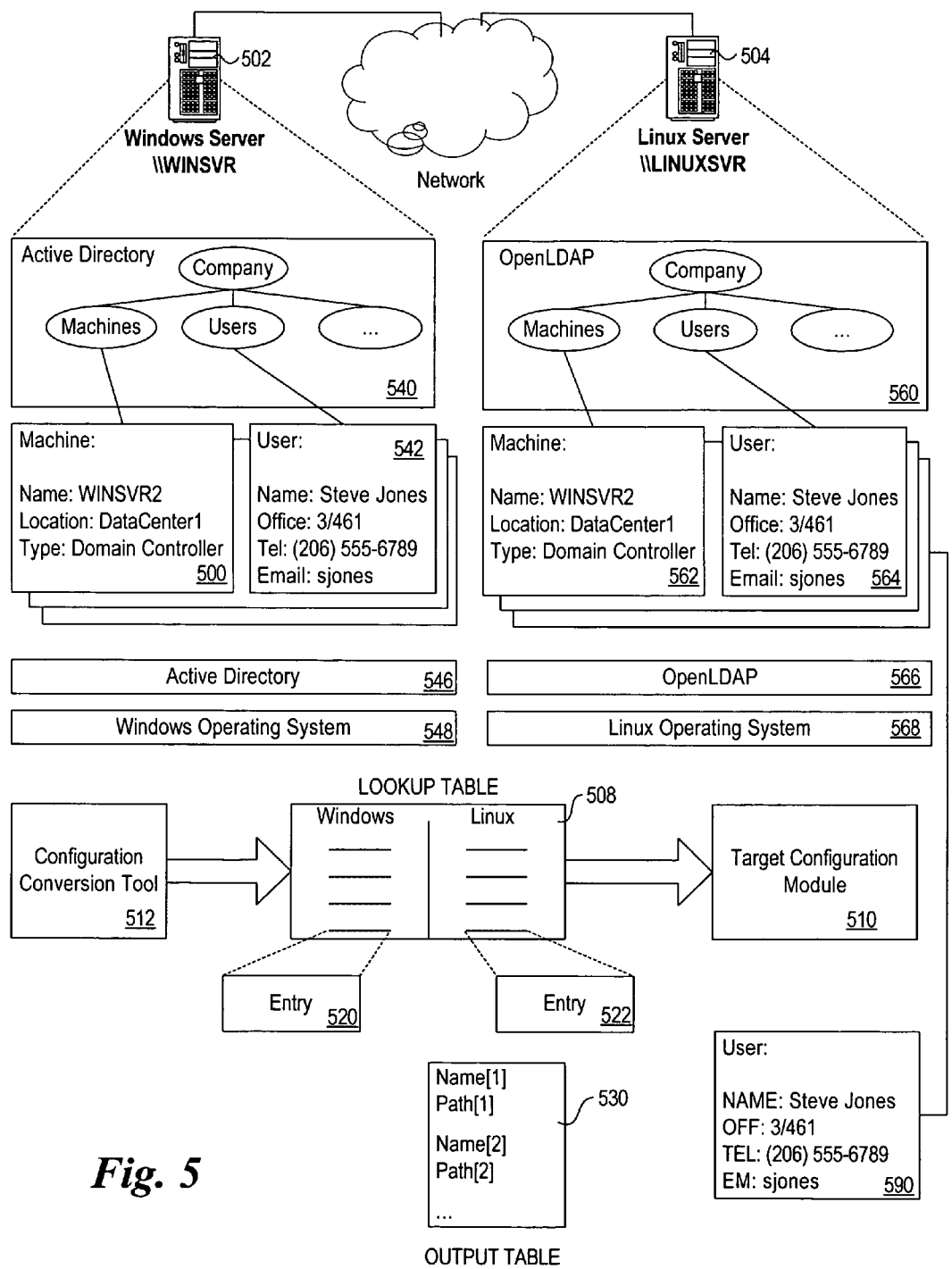
FIG. 5 is a drawing illustrating an embodiment of the present invention, the automated migration of directory services information from Windows® operating system to Linux® operating system.
Figure 6:
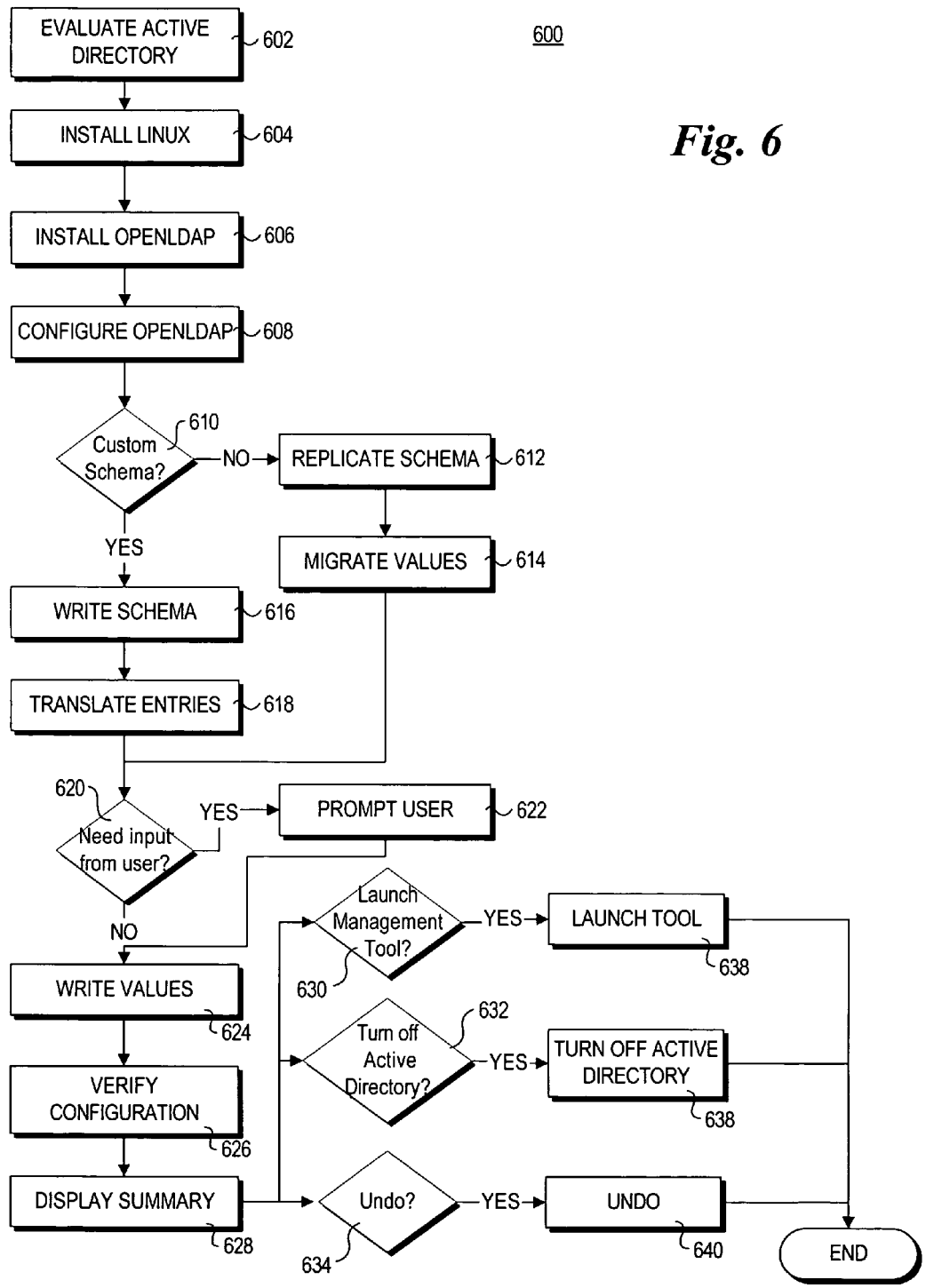
FIG. 6 is a flowchart illustrating operations and logic performed during a directory services migration process, according to one embodiment of the invention.

In another embodiment, as shown in FIG. 5, Configuration Conversion Tool 512 migrates Active Directory (a centralized repository for enterprise directory information running on Windows® Server 502) settings to Linux® Server 504, as illustrated by the process flow 600 of FIG. 6. The process begins in a block 602, wherein Configuration Conversion Tool 512, running either on Windows® Server 502 or on another machine with access to the network, evaluates the Active Directory 546 database. In one embodiment, this evaluation is performed using the Windows® operating system provided Application Programming Interfaces (APIs) for accessing the data contained within Active Directory 546. In another embodiment, the Active Directory database files are read directly.

In one embodiment, Configuration Conversion Tool 512 installs Linux® operating system software 568 if necessary, in a block 604, followed in a block 606 by OpenLDAP directory services software 566 if it is not already installed on Linux® Server 504. Configuration Conversion Tool 512 then configures OpenLDAP software 566, in a block 608. It will be recognized that OpenLDAP is one directory services application and that a number of such applications could be used, including, but not limited to, Novell eDirectory, or an implementation of Active Directory running on the Linux® operating system.

Based on user input at a decision block 610, in one embodiment, Target Configuration Module 510 configures OpenLDAP repository 560 to have the same schema as Active Directory repository 540. That is, both the field types, such as Name, Office, etc. and the structure, such as the relationship between Company and Machines and Users, of repository 540 are, in an innovative aspect of the invention, automatically replicated into OpenLDAP repository 560 by Configuration Conversion Tool 512, as depicted in a block 612. In another embodiment, Target Configuration Module 510 configures OpenLDAP repository 560 with a customized, user-defined, or application-defined schema, or with a pre-defined version of the Active Directory schema, as depicted by a block 616.

In the case that OpenLDAP repository 560 was filled via the replication process, the Configuration Wizard reads each item from repository 540. In a block 614, it finds the associated Translation Entry 520 in Lookup Table 508 and the associated Translation Entry 522 in the Linux® operating system portion of Lookup Table 508. Following the directions of Entry 522, Target Configuration Module 510, directed by Configuration Conversion Tool 512, writes the corresponding entries to OpenLDAP repository 560 in a block 624. Thus the Name key and its associated value Steve Jones in User entry 542 are written by Target Configuration Module 510 to OpenLDAP repository 560 resulting in entry 564 in block 624.

In the case that OpenLDAP repository 560 was filled via the writing process, Target Configuration Module 510 follows the instructions in Entry 522 to translate the Active Directory entry into an appropriate OpenLDAP repository 560 entry, and repeats for all entries, as depicted in a block 618. In one embodiment, the members of the User entry 542 are translated into the members of the User entry 590, with Name key in Active Directory entry 542 translated into NAME key in the OpenLDAP schema, the Office key to OFF, Tel to TEL, and Email to EM. The Target Configuration Module writes the values, such as "Steve Jones," associated with each key, in block 624.

For any fields where Lookup Table 508 does not provide instructions on how to translate a given field in block 618 or where a migration issue or error occurs in block 614, at decision block 620, Configuration Conversion Tool 512 prompts the user for input in accordance with a block 622, or, depending on the options selected by the user, automatically creates a new field.

In one embodiment, once the migration or translation process is complete, Configuration Conversion Tool 512, in conjunction with Target Configuration Module 510 verifies the configuration in a block 626, running queries against Active Directory 546 and OpenLDAP 566 to ensure the results are the same. Configuration Conversion Tool 512 presents the user with configuration screens in which the user can configure which validation tests to run. Once the process is complete, Configuration Conversion Tool 512 presents the user with a summary of the results in a block 628, with a detailed report also available. The summary indicates what actions were taken, and the success/failure status of the operations. The detailed report shows similar information, but in more detail, showing each entry that was migrated, details about the schema, etc.

In a block 630, Configuration Conversion Tool 512 presents the user with the option to launch a management tool directly, and then launches a management tool in a block 636, if the user desires to make changes to the configuration or perform other management tasks. Configuration Conversion Tool 512 also presents the user with the option to turn off Active Directory 546, in which case if selected at decision block 632, Configuration Conversion Tool 512 calls the appropriate APIs to stop Active Directory 546. Configuration Conversion Tool 512 also allows the user to undo the migration operation, as depicted by a decision block 634, and if selected undoes the migration process in a block 640.

Figure 7:
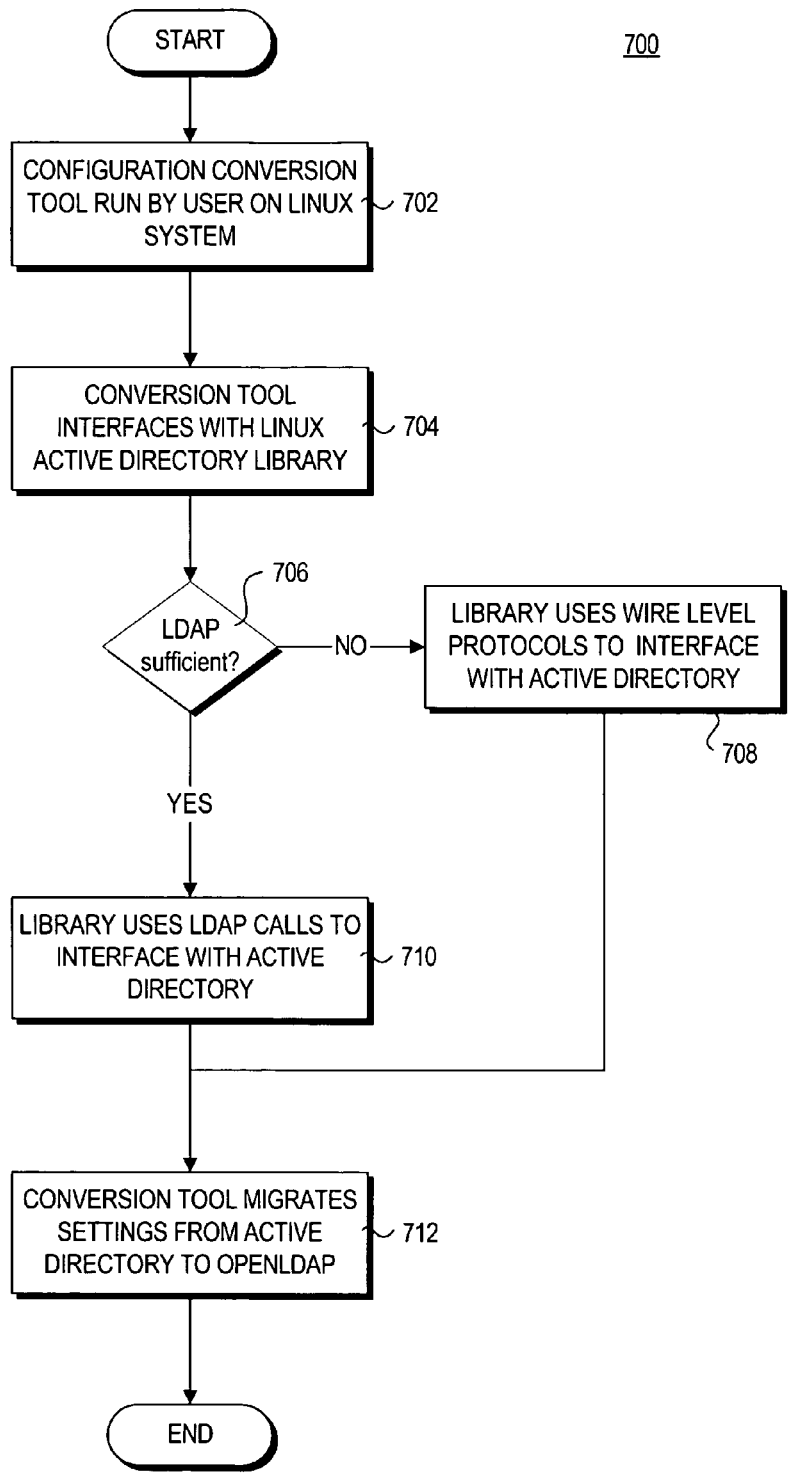
FIG. 7 is a flowchart illustrating operations and logic performed during a directory services migration process under which Active Directory settings are migrated, according to one embodiment of the invention.
Figure 9:
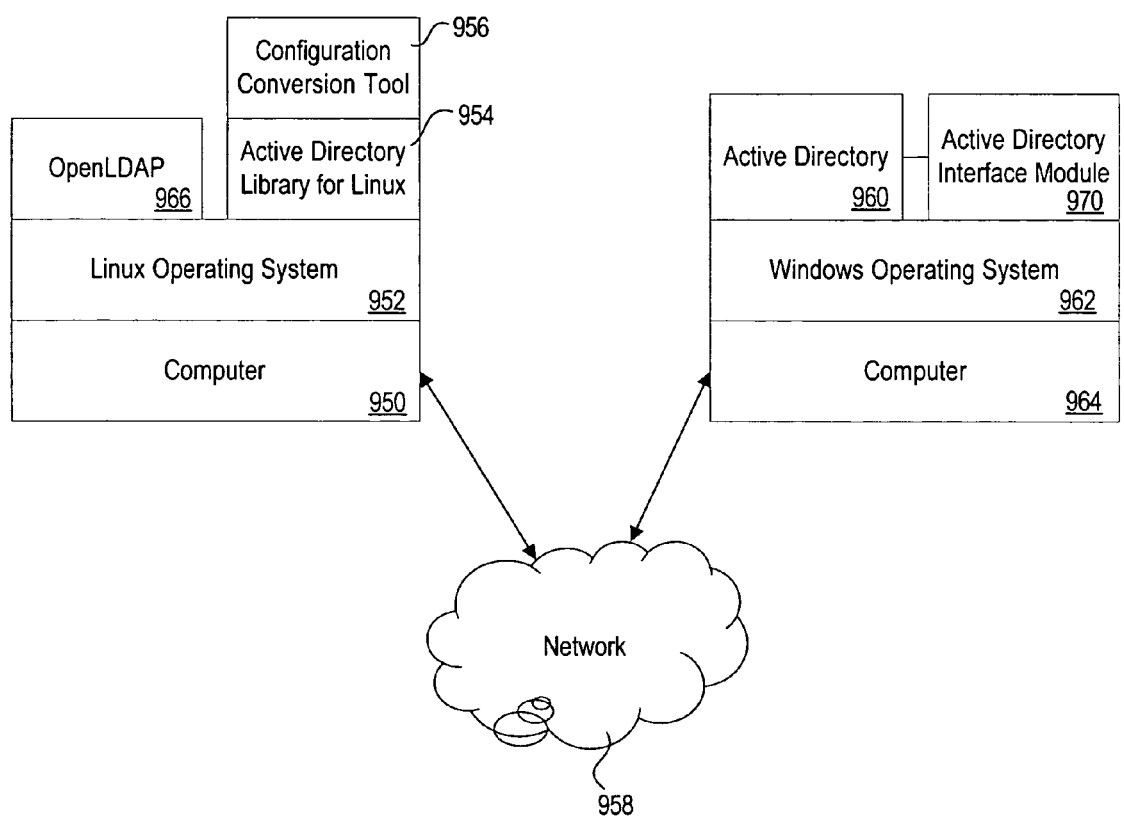
FIG. 9 is a schematic diagram illustrating software components on a source and Linux® target computer used for facilitating the migration process of FIG. 7.

With reference to the flowchart of FIG. 7 and the architecture diagram of FIG. 9, one embodiment of the present invention allows the migration process to be initiated from a system running the Linux® operating system 952. The process begins in a block 702, wherein the Configuration Conversion Tool 956 is run by a user on Linux® computer 950. In a block 704, Configuration Conversion Tool 956 interfaces with a specially-developed Active Directory Library for Linux® operating system 954 on a Linux® server that implements function calls typically supported by the Active Directory programming interface on Windows® operating system. In a block 706, Active Directory Library for Linux® operating system 954 determines whether it can interface with Active Directory 960 running on Windows® operating system 962 on computer 964 over network 958 through a Lightweight Directory Access Protocol (LDAP) function call or by simulating a native Active Directory call using wire level protocols. If LDAP calls cannot be used, the library uses wire level protocols to interface with Active Directory, simulating native Active Directory calls, as depicted in a block 708. If LDAP calls can be used, the library uses LDAP calls to interface with Active Directory 960 in a block 710. Using the appropriate calls, Conversion Tool 956 migrates settings from Active Directory 960 to OpenLDAP repository 966, following aspects of the procedure described above with reference to FIG. 6. In another embodiment, Configuration Conversion Tool 956 interfaces with innovative Active Directory Interface Module 970, running on Windows® Operating System 962, which has access to the native Active Directory programming interfaces.

Figure 8:
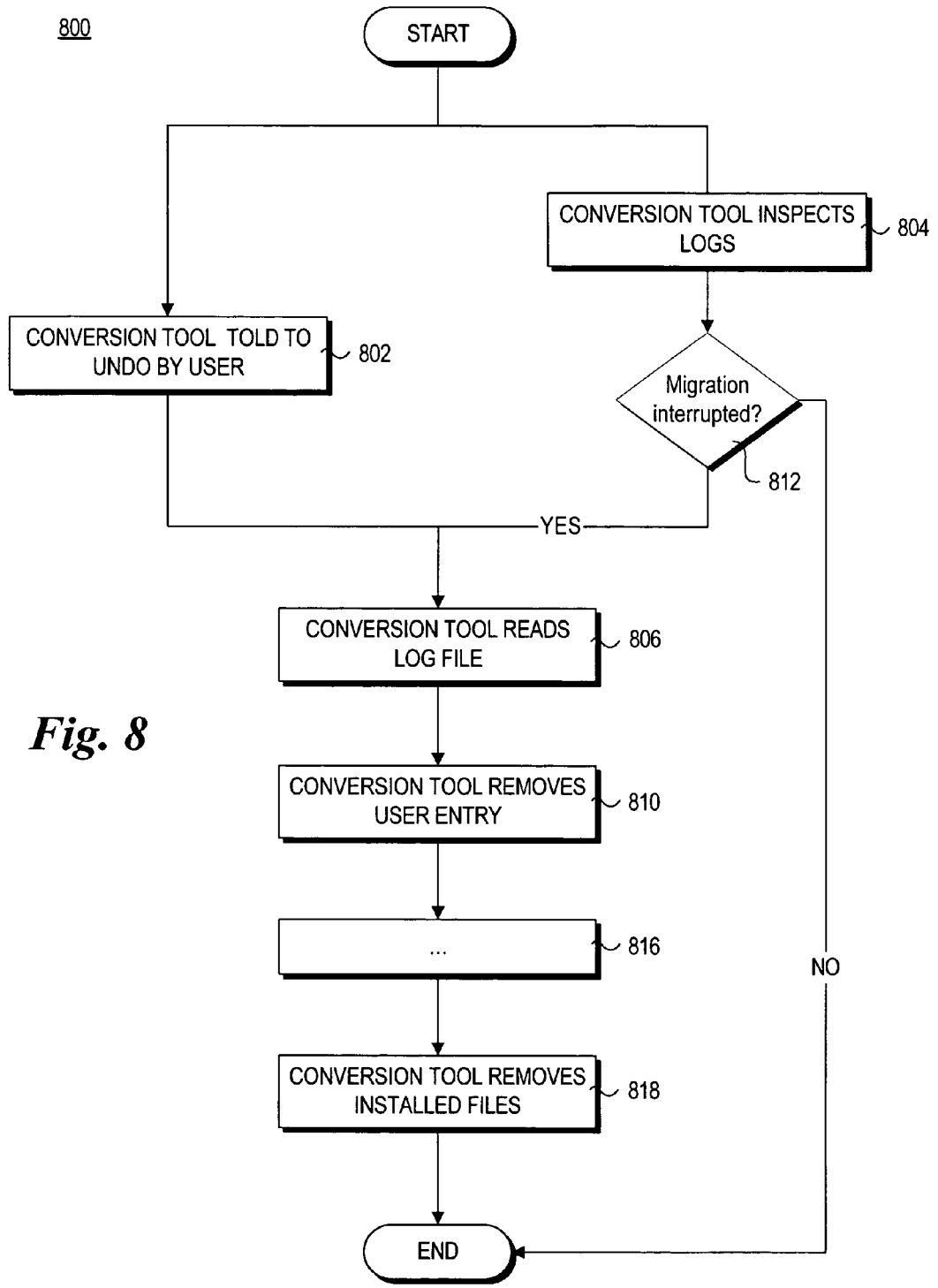
FIG. 8 is a flowchart illustrating operations performed during an undo process, according to one embodiment of the invention.

As illustrated by process flow 800 in FIG. 8, during or after the migration process, Configuration Conversion Tool 512 can undo the migration process. In one embodiment, when Configuration Conversion Tool 512 launches, it checks its internal status logs to determine if any migrations were ongoing, as depicted in a block 804. For example, as a result of a power outage, a migration could be interrupted, resulting in an unknown or non-working state for the source and target systems.

Upon recognizing that a migration was in process at a decision block 812 or upon indication by the user in accordance with a block 802, Configuration Conversion Tool 512 commences the undo process. In one embodiment, during the migration process, Configuration Conversion Tool 512, in conjunction with Target Configuration Module 510 keeps a log of all changes made to Linux® server 504. More specifically, before a change is made, the change to be made is written to the log file; when the change is completed, the log file is updated. Under one embodiment of the undo process, Configuration Conversion Tool 512 with Target Configuration Module 510 reads the log file in accordance with a block 806. In a block 810, Configuration Conversion Tool 512 deletes a user entry from OpenLDAP repository 566. In a block 816, Configuration Conversion Tool 512 reverses the action indicated by each of the remaining log file entries, including, but not limited to, removing files that were installed in a block 818. In another embodiment, rather than undoing individual actions, Configuration Conversion Tool 512 replaces all written files with originals from a stored backup. The result is that Linux® server 504 returns to its original configuration.

As discussed above, the Windows® operating system to Linux® operating system migration functions are implemented via execution of software components. Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc.

Figure 10:
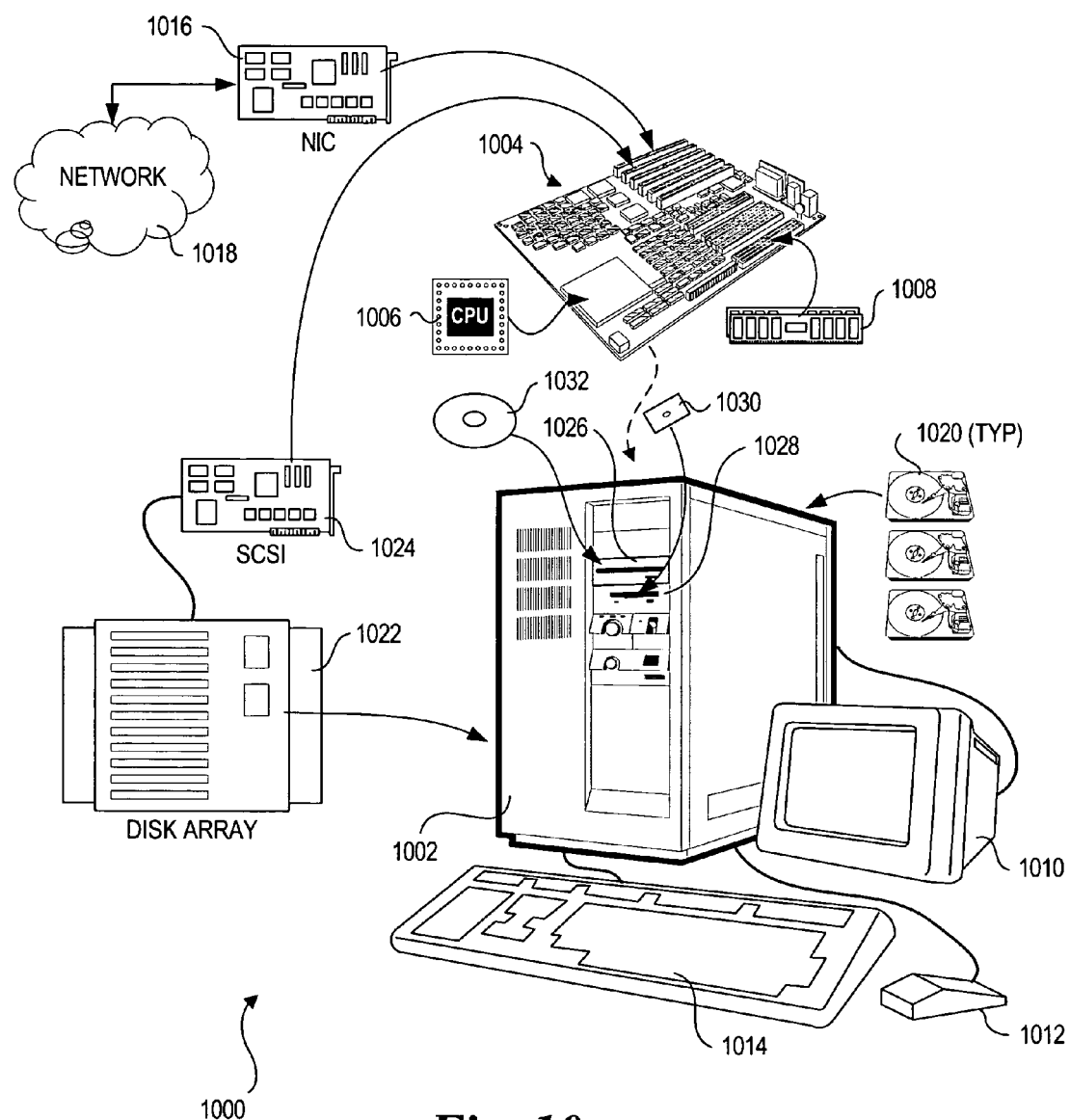
FIG. 10 is a schematic diagram of an exemplary computer system for practicing embodiments of the invention.

With reference to FIG. 10, a generally conventional computer server 1000 is illustrated, which is suitable for use in connection with practicing embodiments of the present invention. Computer server 1000 is generally illustrative of source and target servers discussed above. Examples of computer systems that may be suitable for these purposes include stand-alone and enterprise-class servers operating UNIX-based and Linux®-based operating systems, as well as servers running the Windows® NT or Windows® 2000 Server or Windows® 2003 operating systems.

Computer server 1000 includes a chassis 1002 in which is mounted a motherboard 1004 populated with appropriate integrated circuits, including one or more processors 1006 and memory (e.g., DIMMs or SIMMs) 1008, as is generally well known to those of ordinary skill in the art. A monitor 1010 is included for displaying graphics and text generated by software programs and program modules that are run by the computer server. A mouse 1012 (or other pointing device) may be connected to a serial port (or to a bus port or USB port) on the rear of chassis 1002, and signals from mouse 1012 are conveyed to the motherboard to control a cursor on the display and to select text, menu options, and graphic components displayed on monitor 1010 by software programs and modules executing on the computer. In addition, a keyboard 1014 is coupled to the motherboard for user entry of text and commands that affect the running of software programs executing on the computer. Computer server 1000 also includes a network interface card (NIC) 1016, or equivalent circuitry built into the motherboard to enable the server to send and receive data via a network 1018.

File system storage may be implemented via a plurality of hard disks 1020 that are stored internally within chassis 1002, and/or via a plurality of hard disks that are stored in an external disk array 1022 that may be accessed via a SCSI card 1024 or equivalent SCSI circuitry built into the motherboard. Optionally, disk array 1022 may be accessed using a Fibre Channel link using an appropriate Fibre Channel interface card (not shown) or built-in circuitry.

Computer server 1000 generally may include a compact disk-read only memory (CD-ROM) drive 1026 into which a CD-ROM disk may be inserted so that executable files and data on the disk can be read for transfer into memory 1008 and/or into storage on hard disk 1020. Similarly, a floppy drive 1028 may be provided for such purposes. Other mass memory storage devices such as an optical recorded medium or DVD drive may also be included. The machine instructions comprising the software components that cause processor(s) 1006 to implement the operations of the present invention that have been discussed above will typically be distributed on floppy disks 1030 or CD-ROMs 1032 (or other memory media) and stored in one or more hard disks 1020 until loaded into memory 1008 for execution by processor(s) 1006.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for automatically migrating from a Windows® server to a Linux® target server, comprising:
   automatically extracting Windows® configuration information pertaining to Windows® services hosted by a Windows® server;
   automatically generating Linux® configuration information for a target server to support analogous Linux® services that are analogous to the Windows® services hosted by the Windows® server; and
   automatically installing appropriate Linux® components and configuration files on the Linux® target server to perform the analogous Linux® services in view of the Linux® configuration information that is generated,
   wherein the automatic migration includes automatically migrating Windows® Active Directory information on the Windows® server to corresponding OpenLDAP (Lightweight Directory Access Protocol) configuration information on the Linux® target server.

2. The method of claim 1, wherein the analogous services include file share services, and the method further comprises:
   extracting Windows® file share information from Windows® registry entries stored on the Windows® server;
   translating the Windows® registry entries to corresponding Linux® file share configuration information; and
   storing the Linux® file share configuration information in a Linux® file share configuration file on the Linux® target server.

3. The method of claim 1, further comprising:
   automatically migrating data files stored on the Windows® server to the Linux® target server in a manner that preserves security information for the migrated data files.

4. The method of claim 3, further comprising:
   generating a backup of the data files that are migrated.

5. The method of claim 3, wherein migrating the data files comprises:
   copying the data files from the Windows® server to the Linux® target server; and
   deleting the data files on the Windows® server.

6. The method of claim 5, further comprising:
   scanning the data files for viruses; and
   not copying a data file to the Linux® target server if the data file is detected to have a virus.

7. The method of claim 1, further comprising:
   determining a network name for the Windows® server; and
   renaming the target server with the network name of the Windows® server.

8. The method of claim 1, wherein migrating the Windows® Active Directory information comprises:
   extracting Windows® Active Directory information from an Active Directory database;
   replicating the Windows® Active Directory information in an OpenLDAP (Open Lightweight Directory Access Protocol) repository hosted by the Linux® target server.

9. The method of claim 1, further comprising:
   enabling a user to selectively undo all or a portion of a migration process.

10. The method of claim 1, further comprising:
    searching a network to identify Windows® and potential Linux® target servers connected to the network; and
    enabling a user to select a Windows® server comprising a migration source and a target server comprising a migration target, wherein configuration information is migrated from the migration source to the migration target.

11. The method of claim 1, further comprising:
    storing the Linux® configuration information in a repository; and
    retrieving the Linux® configuration information from the repository; and
    installing appropriate Linux® components and configuration files on multiple Linux® target servers to perform the analogous Linux® services in view of the Linux® configuration information that is retrieved.

12. The method of claim 1, wherein installation of the appropriate Linux® components and configuration files on the Linux® target server includes automatically installing a Linux® operating system on the Linux® target server.

13. The method of claim 1, wherein the Linux® target server comprises a Linux® server running an instance of the Linux® operating system prior to initiation of the migration process.

14. A tangible computer readable storage medium having stored thereon a set of instructions, when executed by a computer, cause said computer to perform operations to facilitate migration from a Windows® server to a Linux® server, the operations including:
    extracting Windows® configuration information pertaining to Windows® services hosted by a Windows® server;
    migrating Windows® Active Directory information on the Windows® server to corresponding OpenLDAP (Lightweight Directory Access Protocol) configuration information on the Linux® target server;
    generating Linux® configuration information for a target server to support Linux® services analogous to the Windows® services hosted by the Windows® server, the Linux® configuration information including Linux® configuration files; and
    installing, in view of the Linux® configuration information that is generated, the configuration files and appropriate Linux® components on the target server to enable the target server to perform the Linux® services that are analogous to the Windows® services.

15. The tangible computer readable storage medium of claim 14,
    wherein
    the Linux® services that are analogous to the Windows® services include file share services, and execution of the instructions performs further operations including:
    extracting Windows® file share information from Windows®
    registry entries stored on the Windows® server;
    translating the Windows® registry entries to corresponding
    Linux® file share configuration information; and
    storing the Linux® file share configuration information in a
    Linux® file share configuration file on the target server.

* * * * *